United States Patent [19]
Thiess et al.

[11] 3,944,444
[45] Mar. 16, 1976

[54] METHOD FOR HEAT TREATING CYLINDRICAL PRODUCTS

[75] Inventors: Harold C. Thiess, Salem, Wis.;
Harold N. Jahnke, Mount Prospect, Ill.

[73] Assignee: A. Finkl & Sons Company, Chicago, Ill.

[22] Filed: Nov. 19, 1971

[21] Appl. No.: 200,393

Related U.S. Application Data

[63] Continuation-in-part of Ser. No. 145,203, May 20, 1971, abandoned.

[52] U.S. Cl. .............. 148/12.4; 148/125; 148/151; 148/152
[51] Int. Cl. .......................... C21d 1/62; C21d 9/38
[58] Field of Search .......... 148/151, 152, 12.4, 125

[56] References Cited
UNITED STATES PATENTS

| | | | |
|---|---|---|---|
| 2,844,500 | 7/1958 | Peras | 148/125 |
| 2,935,433 | 5/1960 | Pribyl | 148/152 |
| 3,131,097 | 4/1964 | Mantel | 148/125 |
| 3,505,133 | 4/1970 | Soneki et al. | 148/152 |
| 3,682,721 | 8/1972 | Seulen et al. | 148/152 |

Primary Examiner—W. W. Stallard
Attorney, Agent, or Firm—James G. Staples

[57] ABSTRACT

Method and apparatus for producing cylindrical products having a range of hardness through a cross section such as a roll. The method includes conventional forging and heat treatment steps with or without the addition of a rapid water quench derived from direct impingement of a quench medium on the product as it rotates in a horizontal position, followed, as a final heat treatment, by subjection either to direct flame impingement in a horizontal, rotating condition or flame heat in a vertical furnace while rotating, again followed, preferably, by a drastic quench, and, also preferably an extremely low temperature deep freeze operation to thereby convert substantially all austenite to martensite. The invention makes possible the production of rolls capable of usage from original diameter to scrap diameter without reconditioning.

19 Claims, 6 Drawing Figures

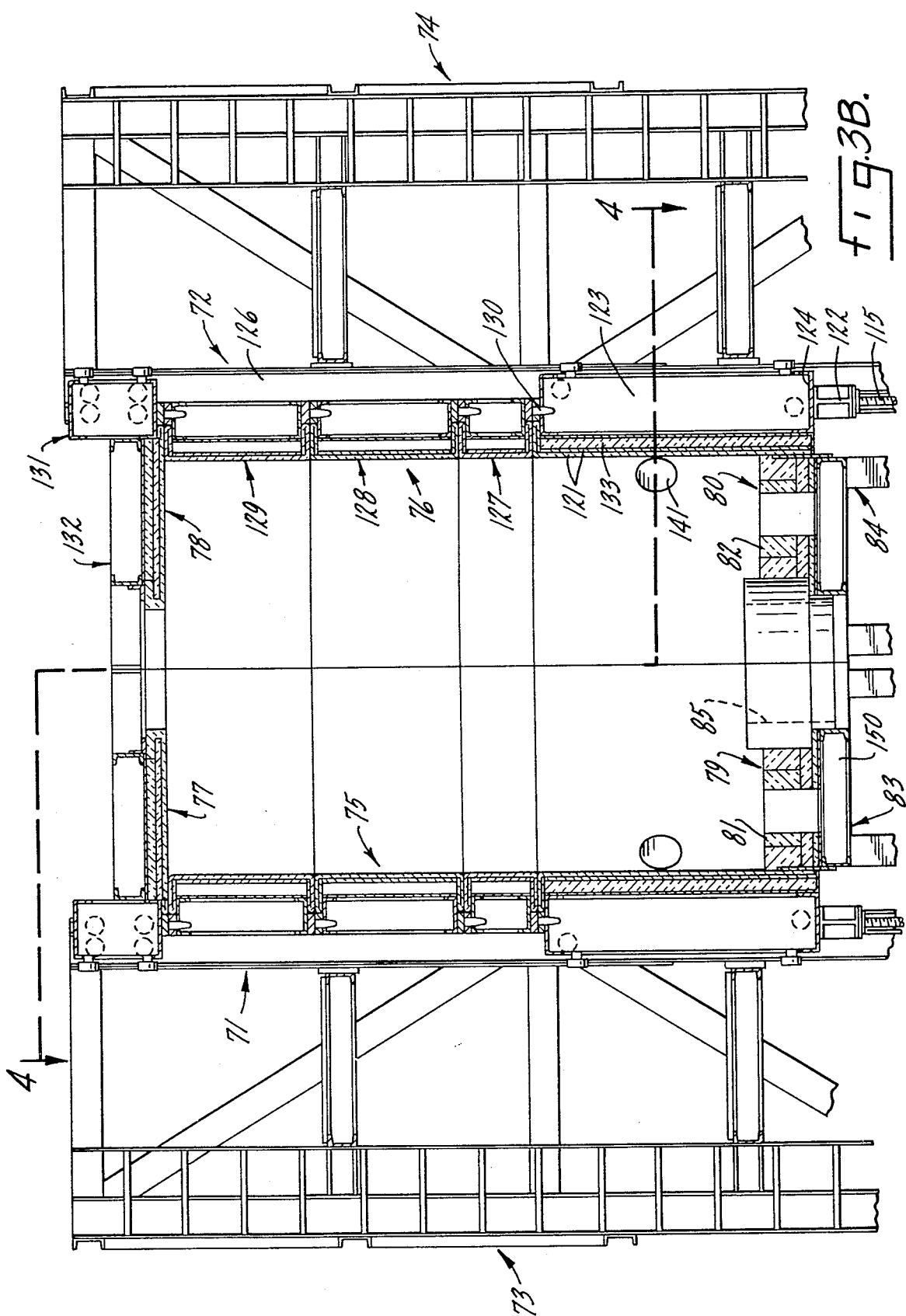

METHOD FOR HEAT TREATING CYLINDRICAL PRODUCTS

This application is a continuation-in-part of Ser. No. 145,203 filed May 20, 1971, now abandoned.

This invention relates to methods and apparatus for producing cylindrical products in which a range of hardness through a cross section is required, and the product produced thereby.

Although the invention is applicable to a wide range of products in the nuclear, steam, electrical generation, and distribution fields, among others, it will be described in connection with rolling mill rolls. The term "rolling mill rolls", as used in this specification and the claims refers to the type of rolls used in the production of ferrous, non-ferrous (including stainless) steels, textile, paper, rubber, plastic, or indeed any material which is required in sheet or plate form in a wide variety of surfaces, and finished sizes ranging from 0.00035 inch to 4 inches thick, and from 8 inches to 98 inches wide. Temper mill, tandem mill, work, roughing, entry, back-up, idler, leveller, pitch and foil rolls are illustrative of the types of rolls produced in accordance with the invention. Other products such as rotors, generator shafts crusher shafts, discs, transmission shafts, and valve bodies are also within the scope of the invention.

Few engineering parts are subjected to such severe service conditions as are mill rolls used in steel mills since such rolls are intermittantly subjected to loads well above their endurance limit. In addition, good wear and abrasion resistence, high hardness, specific surface characteristics, and the ability to withstand severe shock loading, together with the ability to respond to shot blasting and grinding whereby a uniform, reproducible pattern may be formed does not readily wear, are all essential requirements of such a roll.

PRIOR ART

The four most widely used methods of producing such rolls today are the dynamic progressive induction, static induction, conventional, and differential conventional methods of roll making. Each of these four basic methods has certain advantages and, likewise, certain disadvantages.

Thus, the induction methods are characterized by good reproducibility, but the product is not as good as is the product of the conventional methods, particularly with respect to metallurgical properties, finish and hardness pattern within the product cross section. Further, the peak tensile stress is concentrated in a smaller area which can lead to a high rate of service failures. Furthermore, distortion and residual stress levels are a problem with such rolls.

Also, temperature uniformity and consistency of control is a problem. That is, in order to obtain the proper temperature at the critical demarcation zone, it is necessary to increase the surface temperature to a level substantially higher than the optimum treatment temperature at the critical demarcation zone. This increased surface temperature causes grain growth in the surface area which in turn will result in poor mechanical and metallurgical propeties of the final roll. Spalling may be a considerable problem. Finally, the induction methods require relatively high equipment and operational costs.

The conventional thru-heating method of roll making requires relatively low equipment costs but it is characterized by a relatively high manufacturing failure rate, and distortion is usually a serious problem.

The differential conventional method of roll making is probably the best of the conventional systems but it has the substantial drawbacks that successful production depends very heavily upon the skill of the individual operator. Further, as with the conventional method, distortion and residual stresses in the roll are quire high.

Another method known to the art is the flame hardening oxygen — acetylene method. This method is, at the moment, little favored since hardening is only effective to about a radial depth of ⅜ inch and for useful service a roll must be hardened to a radial depth of about 1 to 1½ inches.

BRIEF SUMMARY OF THE INVENTION

Accordingly, the primary object of the invention is to provide a method and apparatus for producing rolls which have mechanical and metallurgical properties equal or better than rolls produced by any of the commercially practiced methods, said mechanical and metallurgical properties including good reproducability during manufacture, good surface characteristics and hardness, minimum distortion, a wider stress reversal range, lower residual stresses, a low manufacturing failure rate, higher productive values, low initial equipment and operating costs, and which lends itself to automated and semi-automated production.

This primary object is achieved by the employment of a combination heating and quenching unit, said unit being usable in the final hardening step and being capable of simultaneously rapidly heating the entire body surface of a rotating roll in a horizontal position by an adjustable, low cost fuel flame followed by immediate severe quenching. The quench feature of the combination unit may also be used for the rapid quench required in earlier processing steps and/or then without heating in said combination unit in a later hardening step, as for example, during final hardening furnace treatment.

Yet another object is to provide a vertical gas fired heat treat furnace capable of performing the final heat treatment to a closely controlled temperature over a wide temperature range.

Another object is to provide a method of and apparatus for final hardening which can, within normal operator's skill, easily reproduce a commercially sound product.

A further object is to provide a method of and apparatus for final hardening which achieves very rapid heating which in turn results, among other benefits, in reduced scale development.

Another object is to provide a method of and apparatus for final hardening which yields a final product having no soft spots.

A further object is to provide a method of and apparatus for final hardening which minimizes product distortion by virtue of rotation of the product in a true vertical plane.

Another object is to provide a method of and apparatus for final hardening of cylindrical products which can be carried out in a fraction of the time present commercial final hardening procedures require whereby production cycle time can be materially reduced.

A further object is to produce a roll which, in addition to having all of the above described physical and metallurgical properties, is particularly characterized by a uniformly hardened depth at least to 80 Shore at one inch, and higher if desired, and a gradual demarcation zone from high hardness to low hardness.

Another object is to produce a roll as above described which is capable of being reduced from working diameter to scrap diameter without rehardening.

Yet a further object is to produce a roll as above described which has a lower retained austenite level and a higher tempering temperature for a given hardeness value than a conventionally produced roll.

Other objects and advantages of the invention will be apparent from the following description.

DESCRIPTION OF THE DRAWINGS

Several steps in the method of the invention, and part of the unique apparatus used in performing the method, as well as a representation of the product itself are illustrated in the accompanying drawings wherein.

DETAILED DESCRIPTION OF THE INVENTION

In order to clearly explain the method, apparatus and product of the present invention, a typical roll making process will be described commencing with the melting operation.

It will be understood that certain discrete steps in the method of making the roll product of this invention are conventional in and of themselves. However such steps, when considered in combination with the other steps described herein, are unique.

Clean steel is essential for superior rolls, and accordingly melting procedures should be followed which produce steel having maximum cleanliness. Preferably, a melting practice equal to or better than AMS 2301 standards should be employed with a JK rating aim of 2 and a grain size of 8 or better. When highly critical products are required, the specification may be upgraded and possibly CVRM or VAR type procedures should be employed. In any event oxide type inclusions, which are highly likely to nucleate fatigue failures, should be avoided. By the same token sulphide inclusions should be avoided since such inclusions produce lower impact strength and ductility, and are particularly undesirable from a surface cleanliness standpoint.

Following melting the cast ingot is subjected to appropriate heating, and thereafter forged. For optimum results, a maximum temperature of about 2150°F should be used for major reductions with minimum temperature of about 1600°F or higher. Minor reductions can be completed to about 1550°F with planishing to about 1500°F. It will be understood of course that the exact temperatures and heating cycles may vary from plant to plant, analysis to analysis, and product to product depending on equipment and normal processing variations.

Following forging, the product is subjected to a post-forging heat treatment for the purpose of imparting a uniform micro-structure suitable for subsequent heat treatments and rough machining operations. Normally, the hardness upon completion of this treatment is in the range of 27 – 32 Rockwell C. Again, this treatment may be varied from plant to plant although it may include heating in stages to around 1700°, air cooling to about 825°F, reheating to about 1300°F followed by stage cooling, with each stage being followed by an appropriate holding period.

Following the first or post-forging heat treatment, the product should be subjected to a first rough machining process.

After the first rough machining the roll is subjected to a conditioning or intermediate heat treatment, the purpose of which is to produce a tough core together with a micro-structure in the outer layer which is most suitable for final hardening. A heavy continuous carbide network structure should be avoided in any event. This heat treatment may consist, for example, of heating to 1450°F and holding, furnace cooling to about 1300°F and holding, and then cooling to about 1100°F followed by heating to about 1520°F, followed by a hold.

Figure 1:
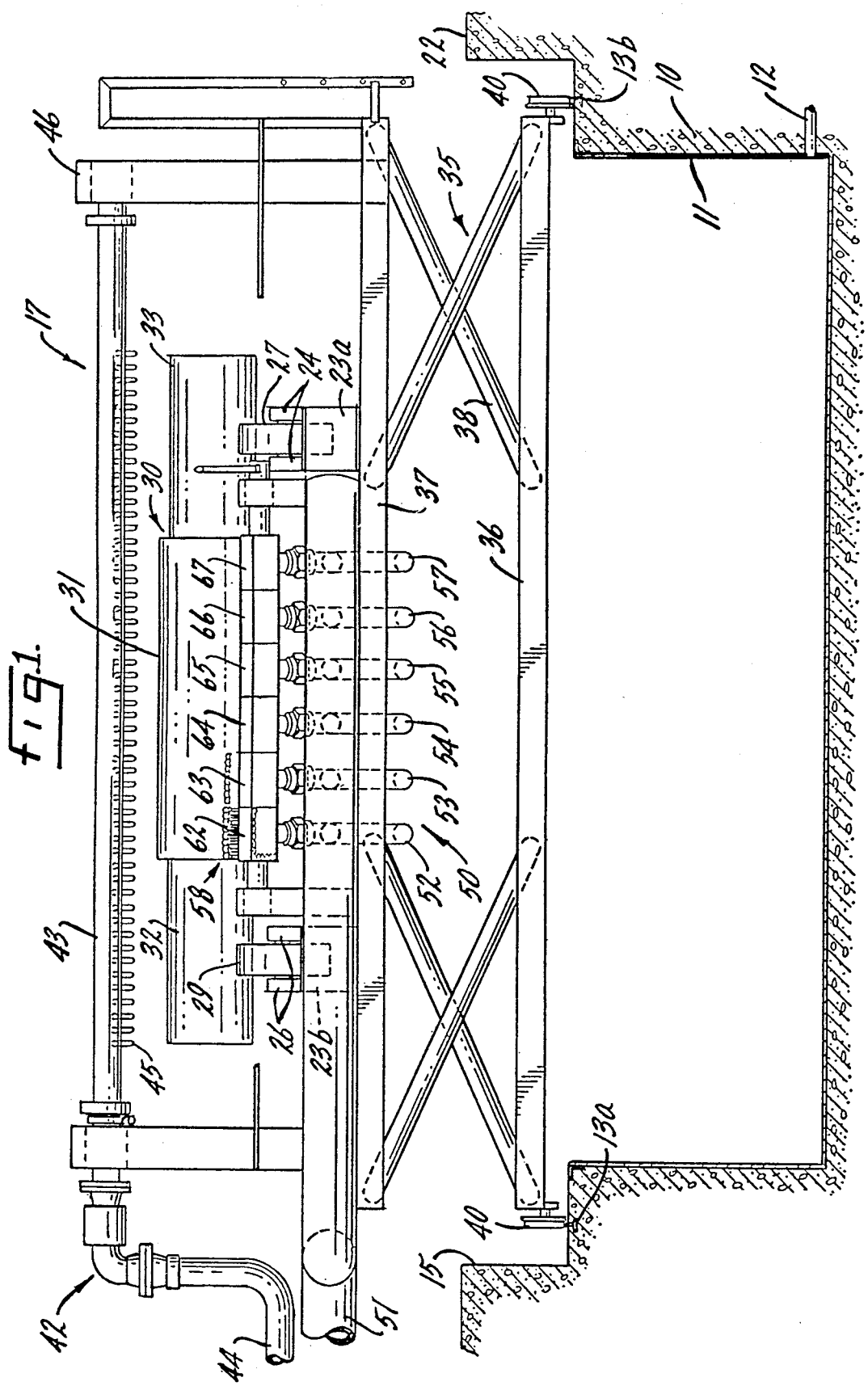
FIG. 1 is an elevation of apparatus for sequentially heating and quenching the product of the invention.
Figure 2:
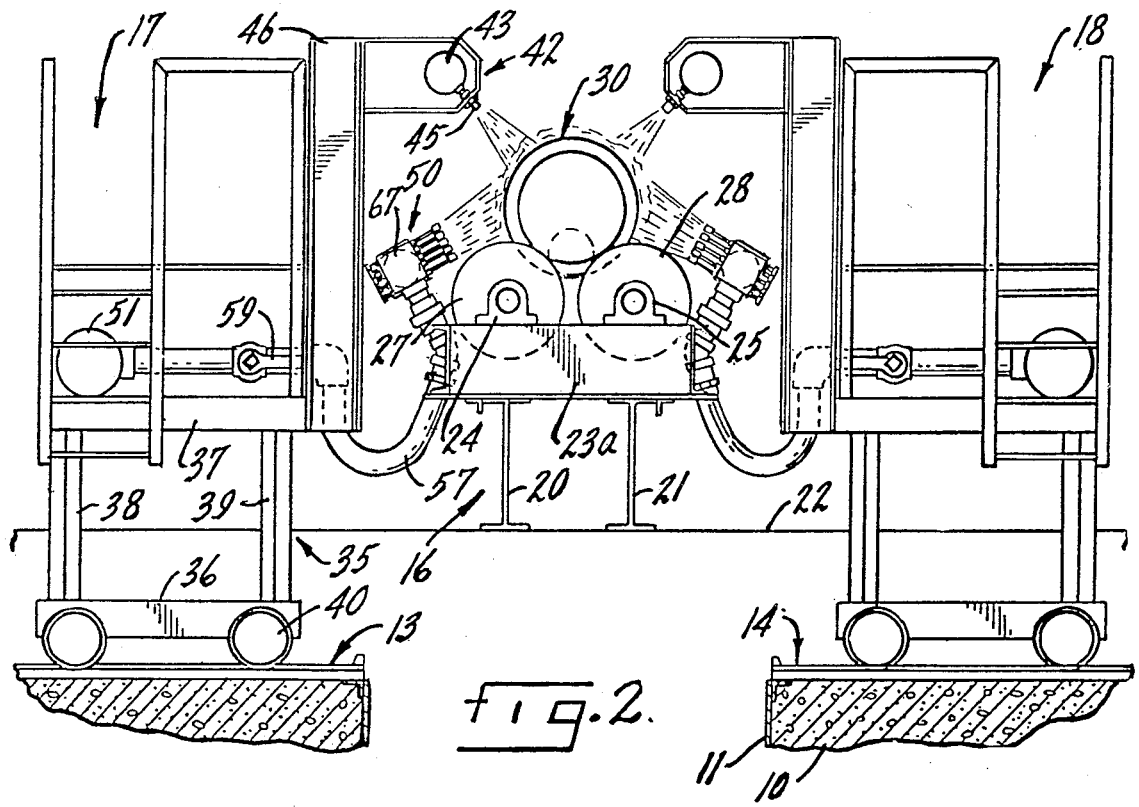
FIG. 2 is an end view of the apparatus of FIG. 1.

Upon completion of this portion of the heat treating cycle the roll is transferred quickly to the apparatus illustrated in FIGS. 1 and 2 and there subjected to a severe quench. Said machine rotates the roll and simultaneously quenches the roll with a uniform spray blanket.

Referring now particularly to FIG. 1 and 2, a foundation is indicated generally at 10. A sump tank for receiving the quench medium, usually water, is indicated at 11, the tank having an outlet 12 leading to a cooling and/or filtering system. Two sets of rails 13 (consisting of 13a and 13b), and 14 are located in the offset area 15 of the foundation.

The combination heating and quenching machine consists essentially of a work supporting structure, indicated generally at 16, and two movable flame heating and quenching stations 17 and 18.

The work supporting structure 16 consists essentially of a pair of I-beams 20, 21 (shown only in FIG. 2) which are supported on floor 22. Journal support structures are indicated at 23a, 23b, each journal support structure supporting two pairs of journals 24, 25 (see FIG. 2) and 26 (see FIG. 1). Each pair of journals supports a roller 27, 28 (see FIG. 2) and 29 (see FIG. 1).

Each pair of rollers support the neck of a roll to be treated, which roll is indicated generally at 30. The roll, which includes body section 31 and necks 32, 33, is rotated at a desired rate by rollers 27, 28 which are driven by any suitable means, not shown.

Each of the movable flame and water generation stations 17 and 18 are substantially identical, and accordingly only one will be described in detail.

Station 17 consists essentially of a framework indicated generally at 35, said framework including a bottom frame 36, top frame 37, and pairs of crossed brace members 38, 39. The framework is mounted on wheels 40 for inward and outward movement to accommodate a wide variety of sizes of rolls to be treated.

A quench medium generating system is indicated generally at 42, said system comprising a header 43 connected to a source of water 44, and a plurality of V-jet nozzles 45 which provide an overlapping spray pattern of refrigerated water for a length which may exceed 20'. The header is supported by end stanchions 45, 46, which are carried by top frame 37.

In the illustrated embodiment of FIG. 1, it will be noted that the nozzles extend the full length of the body roll 30. Additional nozzle sections may be added as desired. It should be understood however that by regulation of suitable conventional valve means, a greater or lesser number of nozzles may be activated depending upon the size of the roll or other cylindrical product to be treated. During the quenching cycles water flow rates for the necks and body portions of the rolls may be controlled to ensure a uniform cooling rate during the entire cycle. This control of the cooling rate minimizes potential failures, distortion, and contributes to achievement of even stress patterns in the product.

During the conditioning or intermediate heat treating process the roll may be rapidly cooled by water quenching to an appropriate temperature, for example, approximately 600°F, then transferred to a furnace to equalize the temperature at the transformation temperature, and thereafter tempered at around 1100°F.

Following the conditioning or intermediate heat treatment, the roll may be subjected to a second rough machining operation to remove scale and decarburization from the body section. At this point in the cycle the product critical diameter is over finish size somewhere between 1/16 inch to ¼ inch diameter.

The final hardening operation follows the second rough machining operation. As those skilled in the art will appreciate, the final hardening treatment is the most critical treatment in the final preparation or re-hardening of a roll.

Since only the body needs to be final hardened, and in view of the drastic quench necessary to obtain the hardness levels required, the difference in cross section between the body or barrel and necks would undoubtedly result in fracture if the entire roll was heated and quenched. To prevent fracture, the necks may be suitably lagged to avoid subjection to austenitizing temperatures.

The hardening temperature must be suitably controlled since the degree of hardening quality, that is the hardenability of the roll, depends primarily on the temperature. It will be understood that during final hardening care should be taken to ensure that the carbide structure should not be excessively course, since this would make the solution of carbide a very slow process. The austenitizing time and temperature must be such as to give adequate carbide solution without creating excessive grain coarsening. The quench must be highly efficient and uniform, and must be extended long enough to extract almost all the heat from the roll to thereby prevent "back tempering" and softening. And finally, the quench must be capable of finally transforming as high a percentage as possible of unstable austenite to martinsite. This latter step is accomplished by deep freezing and tempering which will be described hereinafter.

During the final hardening operation the roll may be preheated to a conventional temperature such as about 400°F by any suitable means, such as a car bottom furnace, to minimize thermal shock during the impingement heating process.

Following preheating preparatory to final hardening, the roll may be returned to the aforedescribed combination unit for direct horizontal dynamic flame heating, or it may alternatively be transferred to a special vertical furnace for vertical, dynamic flame heating. The horizontal method will be described first.

HORIZONTAL DYNAMIC FLAME METHOD

After stabilization at about 400°F the roll is transferred in a horizontal position to the apparatus of FIGS. 1 and 2.

The flame generation system of the combination unit is indicated generally at 50. Said system includes a gas header 51, which is connected by a plurality of valve controlled lines 52 – 57 to a bank of radiant tube stick-tite Eclipse burners indicated generally at 58. The bank of burners in this instance is composed of six sections 62 – 67 respectively which may be actuated at will depending upon the length of the roll or cylindrical product being treated. Cutting in or cutting out burner sections may be quickly and easily accomplished by merely actuating the valve associated with the gas conduit which feeds the sections, such as valve 59 shown best in FIG. 2. Gas header 51 is of course supported on top frame 37.

During operation, the roll is rotated at appropriate speeds which will depend to some extent upon the size of the roll but which, with experience, will become apparent to those skilled in the art.

Initially the burners are ignited to carry out differential heating.

In the illustrated apparatus, heating lengths from 1 to 100 inches can be controlled with maximum input rates of 600,000 btu per hour per inch of length up to a total maximum btu input of approximately 60,000,000 btu's per hour. As illustrated best in FIG. 2, the flames impinge directly upon the body of the roll and, by suitable adjustment of the burner-to-work distance and angle, air/gas ratio, and gas pressure, can be arranged to completely envelope the roll during the heating treatment whereby the roll is uniformly treated. For a conventional roll of approximately 21½inch diameter by 54 inch length, the flame and quench medium impingement may be maintained for a period of approximately 65 minutes. With a conventional 52100 bearing grade steel, which is widely used in the art today, this will result in an effectively treated zone of approximately 1 to 1½inch of radial depth which, on this size roll, corresponds to the expected working life of the roll.

Upon completion of heating, the burners are extinguished and the roll quenched to a pre-determined temperature. Quenching follows immediately after termination of the flame impingement heating which has the advantage tht the roll need not be subjected to higher temperatures than the optimum (thereby reducing the potential for grain coarsening) which is characteristic of currently employed methods.

VERTICAL DYNAMIC FLAME METHOD

A description of the vertical furnace of FIG. 3–5 and its mode of operation is as follows.

The furnace consists of a pair of generally symmetrical shells or half section indicated generally at 71, 72. Section 71 is movable vertically and horizontally with respect to floor 22, and section 72 is movable vertically with respect to floor 22 as will be described in detail hereinafter. Supporting framework for section 71 is indicated generally at 73, and a similar supporting framework for section 72 is indicated at 74. The heat exposed portions of section 71 includes the generally vertical oriented side wall 75 and roof 77 and the heat exposed portions of section 72 includes generally vertical side wall portion 76 and roof 78.

Furnace section 71 includes a burner hearth 79 which consists of a hearth bottom 81 supported by a sub-frame 83 which is movable horizontally with respect to main frame 73. By the same token, section 72 includes burner hearth 80 which consists of hearth bottom 82 supported by a sub-frame 84 which in turn is movable horizontally with respect to main frame 74.

The central opening 85, in operation, is closed by the cylindrical product being treated, said cylindrical product being supported on a roll support assembly indicated generally at 87, said assembly being illustrated, in FIG. 3, in its lower-most or fully retracted position in pit 88.

The roll support assembly 87 consists essentially of a turntable 89 which is rotated by motor 90 which drives pinion gear 91 which in turns rotates turntable drive gear 92, said drive gear being fast with turntable 89.

Figure 3A:
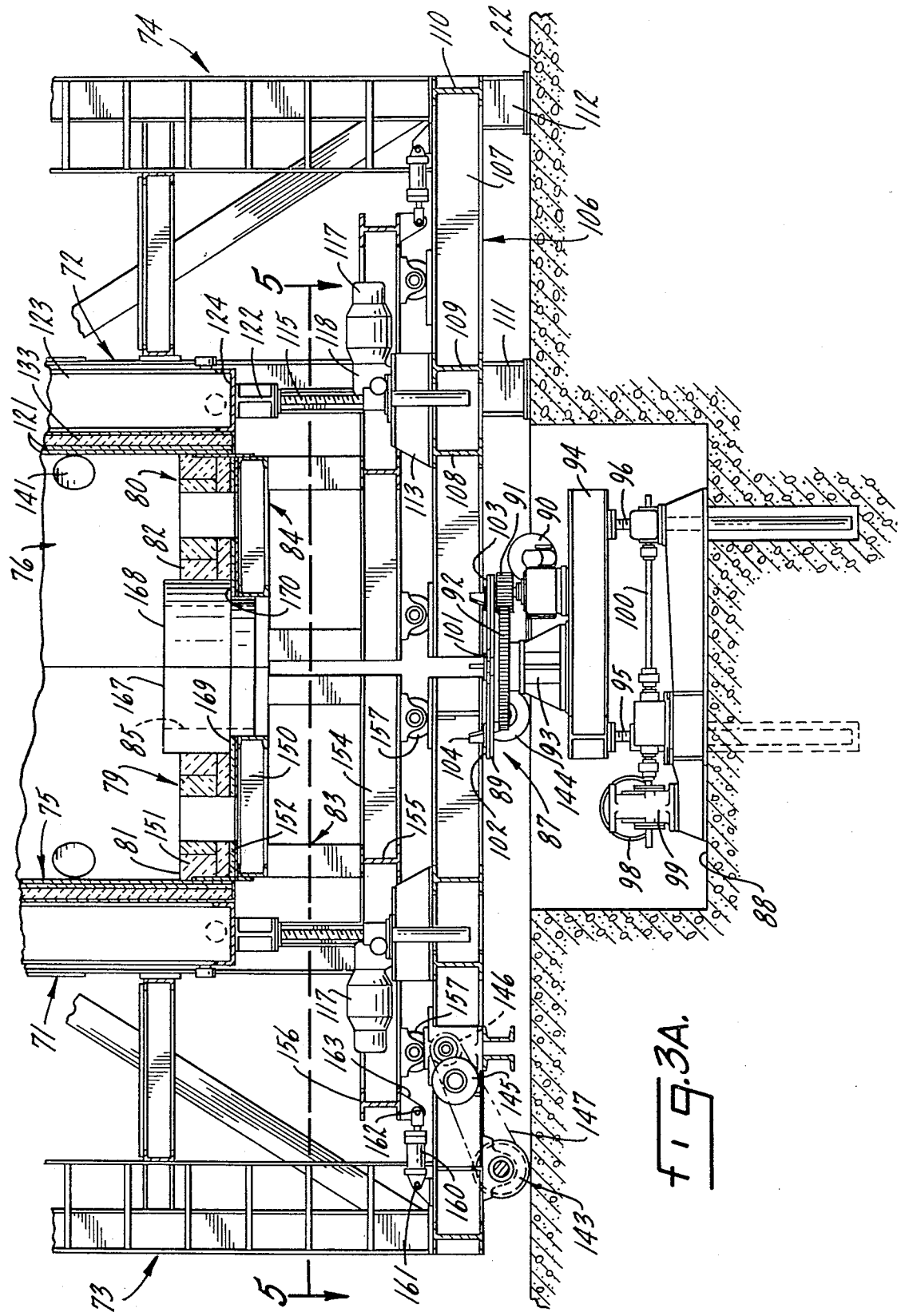
FIG. 3, which includes views 3A and 3B, is an elevation with parts in section and others omitted for clarity of a vertical furnace for final hardening the product of the invention.
Figure 5:
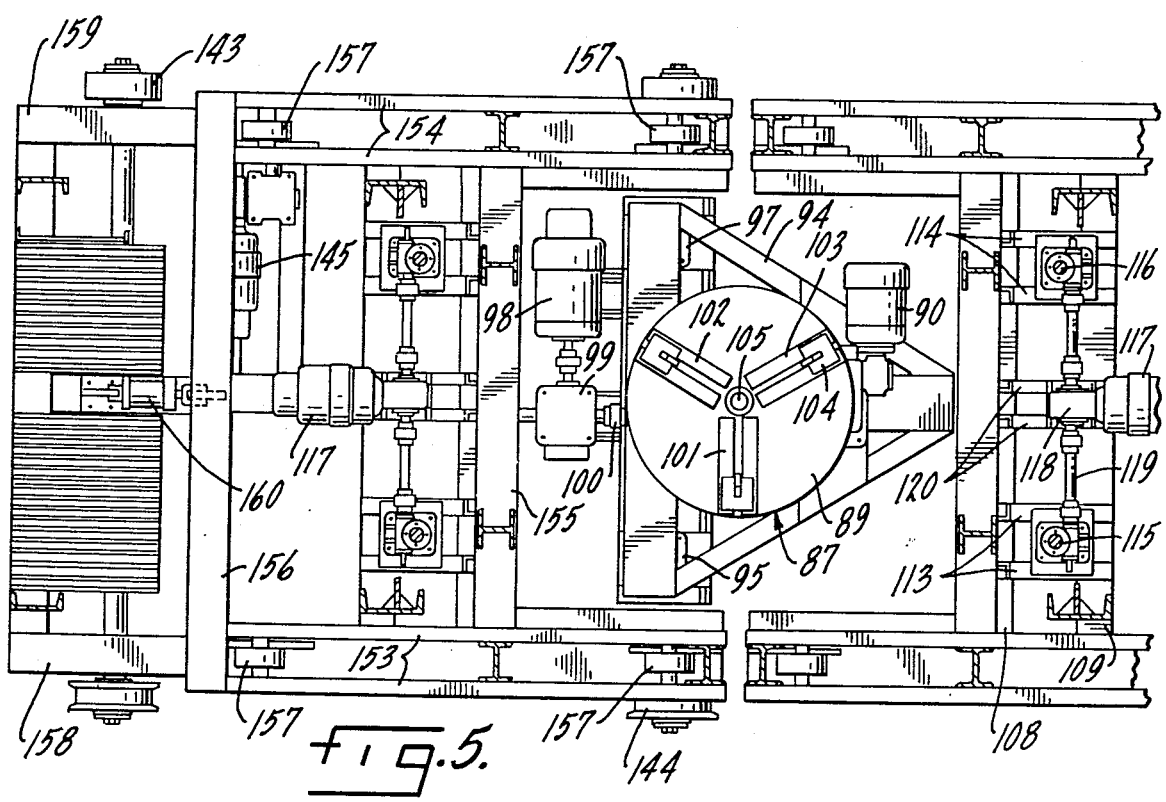
FIG. 5 is a view taken substantially along the line 5 — 5 of FIG. 3.

Turntable 89 and its associated drive gear 92 are supported in a suitable journal arrangement 93 which in turn is carried by a triangular frame 94, best seen in FIGS. 3A and 5.

Frame 94 is supported on three screw jacks 95, 96, 97 which are raised and lowered by motor 98 which drives the jacks through a worm gear speed reducer 99 and conventional drive shafting 100.

Three slideways 101, 102, 103 are fastened to the top of turntable 89, each slideway carrying a tapered chuck 104.

It will be understood that in operation the end of a cylindrical product to be treated, such as a roll, is set upon the slideways 101–103, centered by means of any suitable centering device indicated generally at 105, and stabilized by sliding the chucks 104 along the slideways until they are in engagement with the roll end, and then clamping the chucks to the slideways by any suitable means.

Main frame 74 of section 72 includes a generally horizontally positioned frame 106 consisting of side members 107 and cross members 108, 109 and 110, the frame resting upon bearing structures 111, 112. It will be understood that no traverse cross piece equivalent to members 108, 109, 110 is located to the left of strut 108 in order to provide clearance for the raising and lowering of turntable 89.

A pair of boot assemblies are indicated at 113, 114, each boot assembly supporting a jack screw 115, 116 respectively driven by motor 117, gear reducer 118 and suitable shafting 119, the motor and gear reducer being supported on platform 120. The upper ends of jack screws 115, 116 bear against I-beam 122 which in turn supports lower section 123 of the furnace side wall.

Lower section 123 consists of a structural framework 124 which is adapted to slide upwardly and downwardly along suitable guide rails indicated at 125, 126.

The heating chamber insulation consists of two layers of ceramic fibre Kaowool blanket 121, a low heat storage material available from the Babcock and Wilcox Company, backed by a layer of rock insulation 133. Preferably the Kaowool blankets are fastened to the wall section 123 by clips which helps reduce maintenance. It should be understood that the low heat storage characteristic of the material, which may for example be on the order of 1,824 btu's per square foot as compared to 5497 btu's for insulating fire brick and 48,381 for dense fire brick, reduces fuel requirements and radically cuts turnaround times for both heating and cooling. Further, all heating chamber joints are sealed with Kaowool blanket insulation to prevent heat loss, as best illustrated in FIG. 3B.

The vertical height of the heating chamber can be varied at will by simply adding additional sections of the required size. In FIG. 3B one small section 127, and two large sections 128, 129 have been illustrated. Each section is secured by a peg or other suitable locating and fastening means 130 to the section upon which it rests.

The roof of the heating chamber is formed from a box frame 131 to which an internal, generally semi-circular framework 132 is connected, said framework 132 being lined on its lower side with one or more layers of Kaowool insulation A reverse flow jet flue control system is indicated generally at 140, said flue system including an opening 141 in each of two of the three planar sections forming section 72, the discharge apertures opening into vertically extending flues 142 which in turn are connected to any suitable vent system.

The left half section 71 of the vertical furnace is similar to the just described right half section 72, except main frame 73 is wheel mounted, as at 143, 144 for in and out movement in a horizontal plane with respect to stationary frame 106. Motive power is supplied from motor 145 which drives sprocket 146 which in turn drives wheel 143 through chain 147.

Hearth bottom sections 81, 82, are substantially identical, and accordingly a description of one will suffice for a description of both.

The upper structural platform 150 of moveable sub-frame 83 supports a refractory base which consists, in this instance, of a layer of 2000°F insulating firebrick 151 backed by a layer of block insulation 152.

The lower portion of movable sub frame 83 includes a pair of longitudinally extending channel structures indicated generally at 153, 154 which are secured to and maintained spaced from one another by inner cross strut 155 and outer cross strut 156. Wheels 157, which roll upon the top of I-beams 158, 159 enable the sub-frame 83 to move relative to the main frame 73.

Movement of the sub-frame 83 is accomplished by actuation of hydraulic or pneumatic piston and cylinder assembly 160 which is pivotally connected at its outward end, as at 161, to the main frame, and at its inner end at 162 to a tongue or extension 163 which is welded to the underside of cross strut 156. It will be understood that the stroke of piston and cylinder assembly 160 is rather short, its primary purpose being to establish a gap between the lower heat exposed surface of wall 75 and the outer section of hearth bottom 81.

Figure 4:
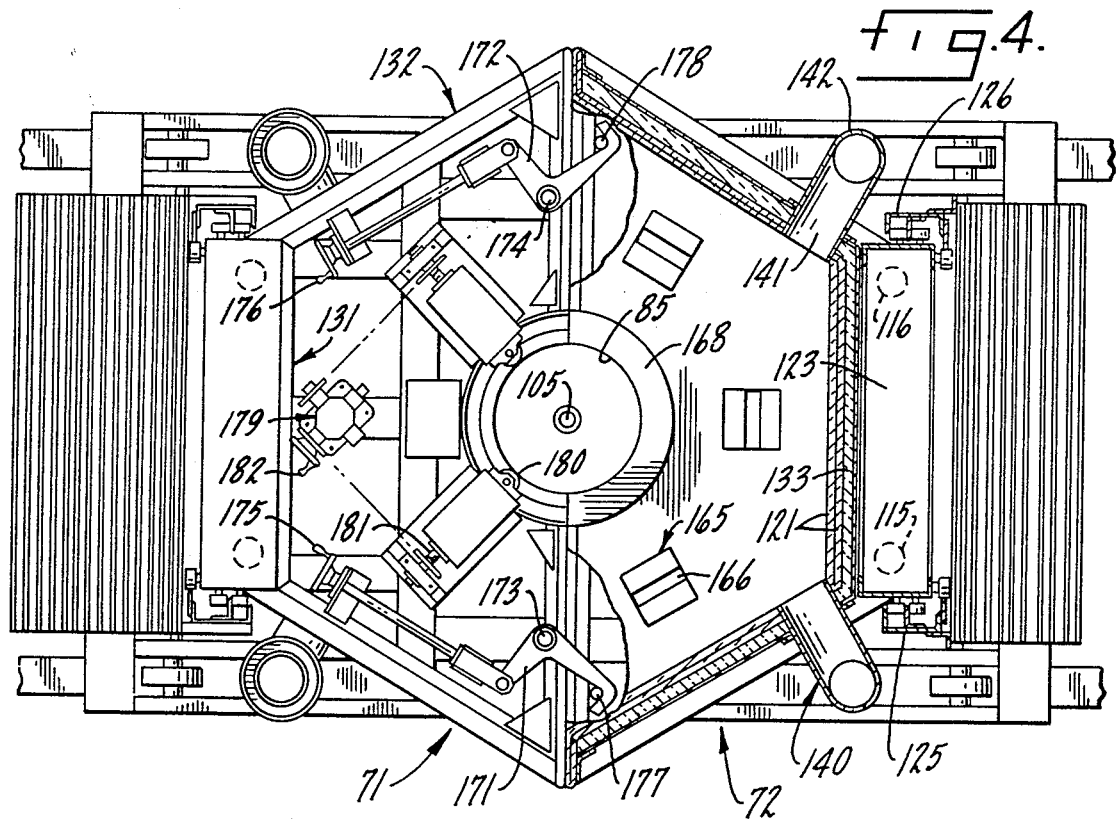
FIG. 4 is a view taken substantially along the line 4 — 4 of FIG. 3.

Six burners are located in the hearth area, three in each of sections 71 and 72 as illustrated best in FIGS. 3A and 4, the burners being indicated generally at 165. Preferably the burners are modified to produce an elongated flame, the opening of which is indicated generally at 166 so as to create a relatively uniform, upward sweep of hot gases during operation.

A pair of castable inserts are indicated at 167, 168 respectively, each insert being carried by an associated furnace section, 71, 72 respectively and being generally hemispherical in shape (best seen in FIG. 4) and resting upon shoulders 169, 170. It will be understood that the bore of the castable inserts, when in an engaged position, conforms to the outside diameter of that portion of the cylindrical product which is not to be heat treated, such as the neck of a mill roll.

It will be understood that a similar pair of hemispherical castable inserts can be carried at the upper end of the furnace to close off direct contact between the portion of the cylindrical product which is not to be heat treated.

Suiitable means may be provided at both the lower and upper ends of the furnace to ensure tightness during operation. Thus, for example a simple ratchet mechanism may advantageously be employed to hold the adjacent, oppositely disposed ends of main frame beams 107 in tight engagement.

By the same token, any suitable mechanism may be employed to maintain the upper ends of the furnace chamber in tight engagement such as the bell-crank lever system illustrated in FIG. 4. As there shown, a pair of bell-crank levers 171, 172 which pivot about pins 173, 174 respectively are rotated by hand cranks 175, 176 respectively into and out of engagement with locking studs 177, 178 carried by furnace section 72.

Means for preventing vibration of the cylindrical product being treated during operation are indicated generally at 179, said means including four vertical stabilizers, each of which consists of a roller or other bearing 180 which is moved radially inwardly and outwardly by jack screws 181 which in turn are chain and sprocket driven from hand crank 182.

In operation, left horizontally reciprocal furnace section 71 is moved several feet to the left by actuation of motor 145 whereby the heating chamber is opened to remove a heated product, or make available for insertion a product to be heat treated.

In the event the furnace is being prepared for its first treatment cycle of the day, section 71 will merely be run to the left a distance sufficient to provide ample clearance for an overhead crane to bring the product to be treated into position.

Prior to closing the chamber, it may be desired to vary the relative vertical spacing between side section 71, 72 and hearth sections 81, 82. In this event, piston and cylinder assemblies 160 will be actuated to move each of hearth sections 81, 82 inwardly away from the interior surfaces of wall section 75, 76. It will be understood that in view of the non-structural surface of the Kaowool blanket lining 121 and, for that matter, a harder, though still abradable surface of the insulating firebrick 151, it is necessary to separate these surfaces prior to relative vertical movement to avoid unnecessary abrasion. Thereafter motors 117 are actuated to achieve the desired relative vertical relationship between side sections 71, 72 and hearth sections 81, 82. After the correct vertical positioning of the hearth sections 81, 82 with respect to side wall sections 75, 76 has been accomplished, piston and cylinder assemblies 160 are again actuated to move the hearth sections 81, 82 into abutting engagement with their associated furnace side wall sections 75 and 76 respectively.

Thereafter appropriately sized castable inserts 167, 168 are inserted in the associated hemispherical openings in bottom half of sections 81, 82 and similar inserts placed in position at the upper end of the furnace if desired.

At the same time, the vertical height of the furnace can be varied as by inserting or removing one or more of sections 127, 128, or 129, as required by height of that portion of the cylindrical product to be heat treated. If for example a product shorter than the height of the chamber illustrated in FIG. 3B is to be treated, one or more intermediate sections 127, 128, 129 may be removed.

Thereafter motor 98 is operated to elevate turntable 89 to the desired height, and then the cylindrical product is placed on the bottom end contacting slideways 101, 102 and 103 of turntable 89.

Therafter chucks 104 are slid along the tracks in the center of the slideways until each of the three chucks makes contact with the product, an then the chucks are tightened by any suitable means.

Thereafter the motor 145 is operated in the reverse direction to return section 71 to the position of FIGS. 3 and 4.

Once engagement along the furnace parting line is made, crank levers 171, 172 are actuated to clamp the upper ends of the furnace sections together, and a suitable clamping mechanism, such as a simple ratchet arrangement, may be actuated to clamp the lower portions together.

Finally, crank 182 may be operated on each of sections 71, 72 to move stabilizer members 180 into bearing engagement with the outwardly projecting end of the product to be treated.

In operation, gaseous fuel is admitted to burners 165 and the burners fire vertically to the top of the furnace, sweeping the entire body length of the roll. During operation, the roll will be rotated since motor 90 will rotate turntable assembly 89 at any predetermined selected speed.

It will be noted that since the journals of the rolls are outside of the heating chamber area, no provisions for projecting them are required.

The reverse flow jet flue control system maintains a positive hearth pressure which significantly contributes to improved temperature uniformity.

Following heating, which may for example be maintained for an average of about 100 minutes at approximately 1900°F for a basic 17 inch diameter product, the furnace is opened and the product removed, and then quickly transported to the next processing station which usually will be a water quench.

It will be understood that for each additional increment of diameter, an additonal heating period may be required. Likewise, the dwell time in the quench medium will depend to a great extent upon the heating temperature of the quench. Thus, for example, the basic 17 inch diameter may be maintained in the quench medium for approximately one half hour to 35 minutes when the quench medium is water at 45°F. For a quench medium temperature in excess of a standard condition, additional dwell time may be required in the quench medium.

Following heating and quenching in the final hardening stage in both the horizontal and vertical methods the roll is placed in a deep freeze to promote the products of transformation. A suitable deep freeze unit utilizing the nitrogen evaporation principal and capable of chilling a 10 ton roll to minus 150°F in 5 hours may be employed.

Following the required deep freeze stabilization, the roll will be allowed to stabilize at room temperature for a short period and then placed in a tempering unit for final tempering.

Optionally, the final tempering procedure may consist of subjection to two tempering cycles, one preceding the deep freeze treatment and one following the deep freeze treatment, during which the tempering temperatures should be very closely controlled. By using liquid immersion heating the tempering unit can be made uniform to within plus or minus 3°F. Preferably the tempering medium is an oil having an operating range up to 550°F. This range will cover hardness ranges from 75 to 103 Shore C. Preferably both thermal and mechanical agitation are provided to ensure product uniformity.

Following the final heat treating operation the roll is subjected to a final machining operation which may include rough grinding, shot blasting, hardness uniformity inspection, magnetic permability testing and final turning and grinding.

After final machining and while the roll is still wet, it may be coated with a protective emulsion to retard oxidation, wrapped with a special preservative paper, and coated with a rust inhibitor preparatory to shipment.

In addition to the inherent hardenability of the steel established by the chemistry and grain structure, the method of heating during final hardening is probably the most important factor in obtaining a uniform hardness depth with a gradual demarcation zone accompanied by minimum spalling and failure.

Figure 6:
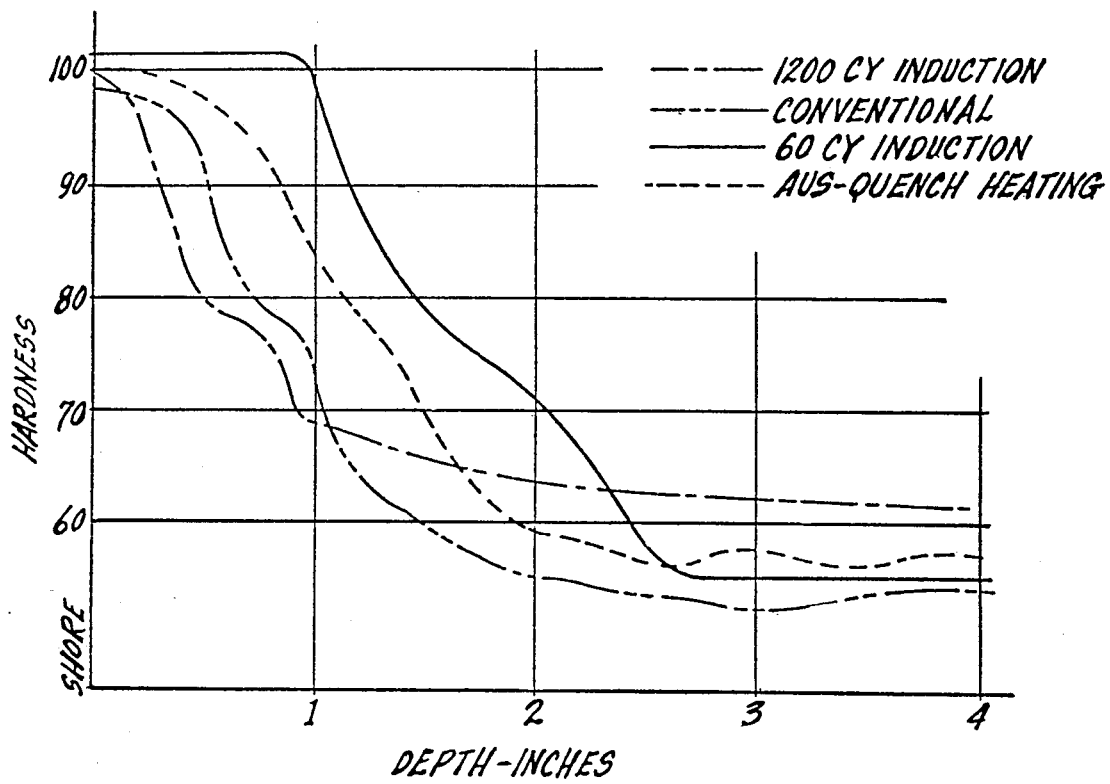
FIG. 6 is a graphic representation of the radial hardness differential of a roll produced by the present invention as contrasted to rolls produced by two prior art methods.

To obtain these features the optimum heat pattern is one that provides a uniformly austentized section for a radial depth of 1 inch, with gradually decreasing temperatures to 1½ inches from the surface, followed by relatively cold metal from that point to the roll center. As can be seen from FIG. 6, this heat pattern is closely approached by the above described treatment since the hardness of a roll treated according to the method of the invention is at a desired hardness level up to a depth of approximately 1 inch from the roll surface, followed by a gradual decrease in hardness to a depth of approximately 1½ inches. This should be particularly contrasted to the low frequency induction treated roll which has a sharp demarcation zone in the critical area which results in fatigue failure when subjected to high cyclic loading stresses. The near optimum condition represented by the hardness-depth curve of the invention in FIG. 6 indicates that the disclosed technique provides an easily established controlled heat zone throughout the roll body, the controlled heat zone enhancing the subsequent quenching action.

Another major factor necessary for optimum hardening is quenching.

To obtain full hardness that is uniform over the roll surface and to the required depth, a drastic quench is necessary. The quench must be uniform and capable of being controllable for pressure, flow and temperature to achieve reproducable results. The roll body must be cooled as rapidly as possible, yet uniformly over its surface, and then maintained at a sufficiently low temperature to ensure as high a percentage as possible of transformation and preclude tempering by retained heat. The illustrated method and apparatus provides such quenching since, following rapid heating, the roll is subjected to immediate or near immediate impingement of cooled water from water headers which in turn is followed by subjection to a deep freeze unit and tempering.

From the foregoing it will be appreciated that the above described method and apparatus provides the following advantages:

1. Uniformly hardened depths to pre-determined hardness levels at 1 inch.
2. Simplified, accurate control for reproducibility.
3. Reduced handling.
4. Semi-automatic operation.
5. Reduced floor area.
6. Multi-purpose quench unit.
7. Ability to reharden a wide variety of used rolls in the same equipment in which new rolls are made.
8. Low initials capital outlay compared to induction hardening processes.
9. Ability to reharden rolls withh or without bores.

Although preferred embodiments of the invention have been illustrated and described it will at once be apparent to those skilled in the art that modifications may be employed within the scope of the invention. Accordingly, the scope of the invention is intended to be defined by the scope of the claims when interpreted in the light of the foregoing description and the pertinent prior art.

We claim:

1. In a method of producing a cylindrical product having a differential radial hardness, such as a mill roll, the steps of subjecting a cylindrical product to conventional conditioning steps prior to the final hardening operation, and thereafter, in the final hardening operation, simultaneously rapidly heating the entire working surface area of said cylindrical product by subjecting the entire working surface area to flame heat for a period of time sufficient to austenitize the cylindrical product to a desired depth, subjecting said entire working surface area of the cylindrical product to a drastic quench which is substantially uniform throughout said area, and thereafter subjecting said cylindrical product to final conditioning.

2. The method of claim 1 further characterized in that the final conditioning includes the step of transforming substantially all unstable austenite to martinsite following the drastic quench by subjecting the cylindrical product to deep freezing.

3. The method of claim 2 further characterized in that the deep freezing consists of a sub-zero nitrogen treatment.

4. The method of claim 2 further characterized by and including the step of uniformly tempering the cylindrical product by liquid immersion heating following the drastic guench.

5. The method of claim 4 further characterized in that the uniform tempering treatment includes two tempering treatments, at least one of which follows the deep freezing treatment.

6. The method of claim 1 further characterized in that said rapid heating is carried out while said cylindrical product is horizontally axised.

7. The method of claim 6 further characterized in that said cylindrical product is relatively rotated with respect to said flame heat during said rapid heating.

8. In a method of producing a cylindrical product having a differential radial hardness, such as a mill roll, the steps of subjecting a cylindrical product to conventional conditioning steps including forging, machining and/or heat treating, prior to the final hardening operation, and thereafter, in the final hardening operation,
simultaneously rapidly heating the entire working surface area of said cylindrical product by subjecting the entire working surface area to flame impingement for a period of time sufficient to austenitize the cylindrical product to a desired depth,
subjecting said entire working surface area of the cylindrical product to a drastic quench which is substantially uniform through said area, and
thereafter subjecting said cylindrical product to final conditioning.

9. The method of claim 8 further characterized in that the final conditioning includes the step of
transforming substantially all unstable austenite to martinsite following the drastic quench by subjecting the cylindrical product to deep freezing.

10. The method of claim 9 further characterized in that the deep freezing consists of a sub-zero nitrogen treatment.

11. The method of claim 8 further characterized in that the flame impingement and drastic quench is maintained for a period of approximately one hour.

12. The method of claim 8 further characterized by and including the step of
uniformly tempering the cylindrical product by liquid immersion heating following the drastic quench and deep freeze treatment.

13. In a method of treating a cylindrical product having a differential radial hardness, such as a mill roll, the steps of
simultaneously rapidly heating the entire working surface area of said cylindrical product by subjecting the entire working surface area to flame impingement for a period of time sufficient to austenitize the cylindrical product to a desired depth, and
subjecting the cylindrical product to a drastic quench which is substantially uniform throughout said area.

14. The method of claim 13 further including the step of
transforming substantially all unstable austenite to martinsite following the drastic quench by subjecting the cylindrical product to deep freezing.

15. The method of claim 14 further characterized in that the deep freezing consists of a sub-zero nitrogen treatment.

16. The method of claim 13 further characterized in that the flame generated heat is maintained for a period of about 100 minutes for a cross section of about 17 inches.

17. The method of claim 13 further characterized by and including the step of
uniformly tempering the cylindrical product by liquid immersion heating following the drastic quench and deep freeze treatment.

18. In a method of producing a cylindrical product having a differential radial hardness, such as a mill roll, the steps of
subjecting a cylindrical product to conventional conditioning steps prior to the final hardening operation, and thereafter, in the final hardening operation,
simultaneously rapidly heating the entire working surface area of said cylindrical product in a vertical condition by simultaneously subjecting said desired surface area to flame generated heat for a period of time sufficient to austenitize the cylindrical product to a desired depth,
subjecting at least said entire working surface area of the cylindrical product to a drastic quench which is substantially uniform throughout said desired surface area,
transforming substantially all unstable austenite to martinsite following the drastic quench by subjecting the desired surface area of the cylindrical product to a liquid nitrogen deep freeze treatment, and
uniformly tempering the desired surface area of the cylindrical product by liquid immersion heating following the drastic quench,
said uniform tempering treatment including two tempering treatments,
at least one of which follows the deep freeze treatment.

19. The method of claim 18 further characterized in that one tempering treatment precedes the deep freeze treatment and one tempering treatment follows the deep freeze treatment.

* * * * *